United States Patent
Kurebayashi (10) Patent No.: US 10,493,898 B2
(45) Date of Patent: Dec. 3, 2019

(54) AUTOMATED VEHICLE AND A VEHICLE LIGHTING SYSTEM THEREOF

(71) Applicant: KOITO MANUFACTURING CO., LTD., Tokyo (JP)

(72) Inventor: Toshihiko Kurebayashi, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 16/227,299

(22) Filed: Dec. 20, 2018

(65) Prior Publication Data
US 2019/0202337 A1 Jul. 4, 2019

(30) Foreign Application Priority Data
Dec. 28, 2017 (JP) .................. 2017-254312

(51) Int. Cl.
*G05D 1/00* (2006.01)
*B60Q 1/04* (2006.01)
*B60Q 1/24* (2006.01)

(52) U.S. Cl.
CPC .......... *B60Q 1/04* (2013.01); *B60Q 1/24* (2013.01); *B60Q 2300/112* (2013.01); *B60Q 2300/14* (2013.01); *B60Q 2300/45* (2013.01); *G05D 2201/0207* (2013.01); *G05D 2201/0212* (2013.01)

(58) Field of Classification Search
CPC .............. G05D 2201/0207; G05D 2201/0212
USPC ........................................... 362/540; 701/23
See application file for complete search history.

(56) References Cited

U.S. PATENT DOCUMENTS

| | | | |
|---|---|---|---|
| 7,979,172 B2* | 7/2011 | Breed | G08G 1/161 701/117 |
| 2008/0161986 A1* | 7/2008 | Breed | G08G 1/163 701/23 |
| 2016/0026180 A1* | 1/2016 | Tsimhoni | G05D 1/0061 701/23 |
| 2018/0157271 A1* | 6/2018 | Urano | B60W 50/0098 |

FOREIGN PATENT DOCUMENTS

JP  9-277887 A  10/1997

* cited by examiner

*Primary Examiner* — Thuy V Tran
(74) *Attorney, Agent, or Firm* — Sughrue Mion, PLLC (57) ABSTRACT

A vehicle lighting system is provided in a vehicle capable of traveling in an automated driving mode. The vehicle lighting system includes a headlamp mounted on a front of the vehicle, an automated driving system (ADS) lamp configured to emit light toward an outside of the vehicle to visually present information relating to automated driving of the vehicle, and a lighting control unit configured to control visual modes of the headlamp and the ADS lamp. The lighting control unit is configured to change the visual mode of the headlamp such that visibility of the ADS lamp from the outside of the vehicle is improved according to at least turning-on of the ADS lamp.

8 Claims, 5 Drawing Sheets

AUTOMATED VEHICLE AND A VEHICLE LIGHTING SYSTEM THEREOF

CROSS-REFERENCE TO RELATED APPLICATIONS

The present application claims the benefit of priority of Japanese Patent Application No. 2017-254312, filed on Dec. 28, 2017, the content of which is incorporated herein by reference.

TECHNICAL FIELD

The present disclosure relates to a vehicle lighting system. Particularly, the present disclosure relates to a vehicle lighting system provided in a vehicle capable of traveling in an automated driving mode. Further, the present disclosure relates to a vehicle including the vehicle lighting system.

BACKGROUND

Recently, researches on automated driving techniques of automobiles have been actively conducted in various countries, and each country considers legislation to allow a vehicle (hereinafter the "vehicle" refers to an automobile) to travel on public roads in an automated driving mode. In the automated driving mode, a vehicle system automatically controls the traveling of the vehicle. Specifically, in the automated driving mode, the vehicle system automatically performs at least one of steering control (control of a traveling direction of the vehicle), brake control and accelerator control (control of braking and acceleration/deceleration of the vehicle) based on information (surrounding environment information) indicating surrounding environment of the vehicle obtained from a sensor such as a camera or a radar (for example, a laser radar or a millimeter wave radar). On the other hand, in a manual driving mode described below, a driver controls the traveling of the vehicle as is the case of the conventional vehicles. Specifically, in the manual driving mode, the traveling of the vehicle is controlled according to the driver's operation (the steering operation, the brake operation, and the accelerator operation), and the vehicle system does not automatically perform the steering control, the brake control, and the accelerator control. Herein, the driving mode of the vehicle does not refer to concept which exists only in some vehicles but refers to concept which exists in all vehicles including a conventional vehicle not having an automated driving function and is classified according to, for example, a vehicle control method or the like.

Accordingly, it is expected in the future that a vehicle traveling in the automated driving mode (hereinafter referred to as an "automated driving vehicle" as appropriate) and a vehicle traveling in the manual driving mode (hereinafter referred to as a "manual driving vehicle" as appropriate) coexist on a public road.

As an example of an automated driving technique, JP-A-H9-277887 discloses an automatic following travel system where a following vehicle automatically follows a preceding vehicle. In the automatic following travel system, the preceding vehicle and the following vehicle each includes a lighting system, and character information for preventing another vehicle from interrupting between the preceding vehicle and the following vehicle is displayed on the lighting system of the preceding vehicle, and character information indicating that the following vehicle automatically follows the preceding vehicle is displayed on the lighting system of the following vehicle.

In an automated driving society where the automated driving vehicle and the manual driving vehicle coexist, it is expected that a vehicle is mounted with an automated driving system lamp (hereinafter, referred to as an "ADS lamp") for visually presenting information (for example, information about the automated driving mode of the vehicle) relating to automated driving to a pedestrian or the like. In this case, since the pedestrian can grasp a current situation of the automated driving vehicle by visually recognizing the ADS lamp, the pedestrian's anxiety to the automated driving vehicle can be reduced. Meanwhile, at night, it is assumed that the visibility of the ADS lamp from a pedestrian or the like decreases due to glare light emitted from a headlamp of the automated driving vehicle. Accordingly, in the upcoming automated driving society, there is room for further consideration of improving the visibility of the ADS lamp at night.

SUMMARY

Accordingly, an aspect of the present disclosure provides a vehicle lighting system which can improve the visibility of an ADS lamp from a pedestrian or the like around a vehicle. Further, an aspect of the present disclosure provides a vehicle which can improve the visibility of the ADS lamp from the pedestrian or the like around the vehicle.

According to an embodiment of the present disclosure, there is provided a vehicle lighting system provided in a vehicle capable of traveling in an automated driving mode, the vehicle lighting system including:

a headlamp mounted on a front of the vehicle:

an automated driving system (ADS) lamp configured to emit light toward an outside of the vehicle to visually present information relating to automated driving of the vehicle; and a lighting control unit configured to control visual modes of the headlamp and the ADS lamp, wherein the lighting control unit is configured to change the visual mode of the headlamp such that visibility of the ADS lamp from the outside of the vehicle is improved according to at least turning-on of the ADS lamp.

According to the above configuration, the visual mode of the headlamps is changed such that the visibility of the ADS lamp from the outside of the vehicle is improved according to at least the turning-on of the ADS lamp. Accordingly, it is possible to avoid a situation where a pedestrian or the like around the vehicle cannot visually recognize the light of the ADS lamp due to glare light emitted from the headlamp. Therefore, it is possible to provide the vehicle lighting system which can improve the visibility of the ADS lamp from a pedestrian or the like around the vehicle.

In the above vehicle lighting system, the lighting control unit may be configured to change the visual mode of the headlamp such that the visibility of the ADS lamp from the outside of the vehicle is improved according to the turning-on of the ADS lamp and detection of an object around the vehicle.

According to the above configuration, the visual mode of the headlamp is changed such that the visibility of the ADS lamp from the outside of the vehicle is improved according to the turning-on of the ADS lamp and the detection of the object around the vehicle. Accordingly, it is possible to provide the vehicle lighting system which can improve the visibility of the ADS lamp from the object such as a pedestrian around the vehicle.

In the above vehicle lighting system, the lighting control unit may be configured to change the visual mode of the headlamp such that the visibility of the ADS lamp from the outside of the vehicle is improved according to the turning-on of the ADS lamp and speed of the vehicle.

According to the above configuration, the visual mode of the headlamp is changed such that the visibility of the ADS lamp from the outside of the vehicle is improved according to the turning-on of the ADS lamp and the speed of the vehicle. Accordingly, it is possible to provide the vehicle lighting system which can improve the visibility of the ADS lamp from a pedestrian or the like around the vehicle.

Further, in the above vehicle lighting system, the lighting control unit may be configured to change the visual mode of the headlamp such that the visibility of the ADS lamp from the outside of the vehicle is improved according to the turning-on of the ADS lamp, the detection of the object around the vehicle, and the speed of the vehicle.

According to the above configuration, the visual mode of the headlamp is changed such that the visibility of the ADS lamp from the outside of the vehicle is improved according to the turning-on of the ADS lamp, the detection of the object around the vehicle, and the speed of the vehicle. Accordingly, it is possible to provide the vehicle lighting system which can improve the visibility of the ADS lamp from the object such as a pedestrian around the vehicle.

In the above vehicle lighting system, the lighting control unit may be configured to tile an optical axis of the headlamp downward according to at least the turning-on of the ADS lamp.

According to the above configuration, since the optical axis of the headlamp is tilted downward according to at least the turning-on of the ADS lamp, it is possible to avoid the situation where a pedestrian or the like around the vehicle cannot visually recognize the light of the ADS lamp due to the glare light emitted from the headlamps. Therefore, it is possible to provide the vehicle lighting system which can improve the visibility of the ADS lamp from a pedestrian or the like around the vehicle.

In the above vehicle lighting system, the lighting control unit may be configured to reduce brightness of the headlamp according to at least the turning-on of the ADS lamp.

According to the above configuration, since the brightness of the headlamp is reduced according to at least the turning-on of the ADS lamp, it is possible to avoid the situation where a pedestrian or the like around the vehicle cannot visually recognize the light of the ADS lamp due to the glare light emitted from the headlamps. Therefore, it is possible to provide the vehicle lighting system which can improve the visibility of the ADS lamp from a pedestrian or the like around the vehicle.

In the above vehicle lighting system, the lighting control unit may be configured to change a light distribution pattern formed by the headlamp according to at least the turning-on of the ADS lamp.

According to the above configuration, since the light distribution pattern formed by the headlamp is changed according to at least the turning-on of the ADS lamp, it is possible to avoid the situation where a pedestrian or the like around the vehicle cannot visually recognize the light of the ADS lamp due to the glare light emitted from the headlamp. Therefore, it is possible to provide the vehicle lighting system which can improve the visibility of the ADS lamp from a pedestrian or the like around the vehicle.

Further, according to an embodiment of the present disclosure, there is provided a vehicle capable of traveling in an automated driving mode and includes the above vehicle lighting system.

According to the above configuration, it is possible to provide the vehicle which can improve the visibility of the ADS lamp from a pedestrian or the like around the vehicle.

According to the above configuration, a vehicle lighting system and a vehicle are provided which can improve the visibility of the ADS lamp from a pedestrian or the like around the vehicle.

DETAILED DESCRIPTION

Hereinafter, an embodiment of the present invention (hereafter, referred to as "the present embodiment") is described with reference to the drawings. In the description of the present embodiment, members having the same reference numerals as those already described are not described for convenience of explanation. The dimensions of the members shown in the drawings may be different from those of actual members for convenience of explanation.

Figure 4A:
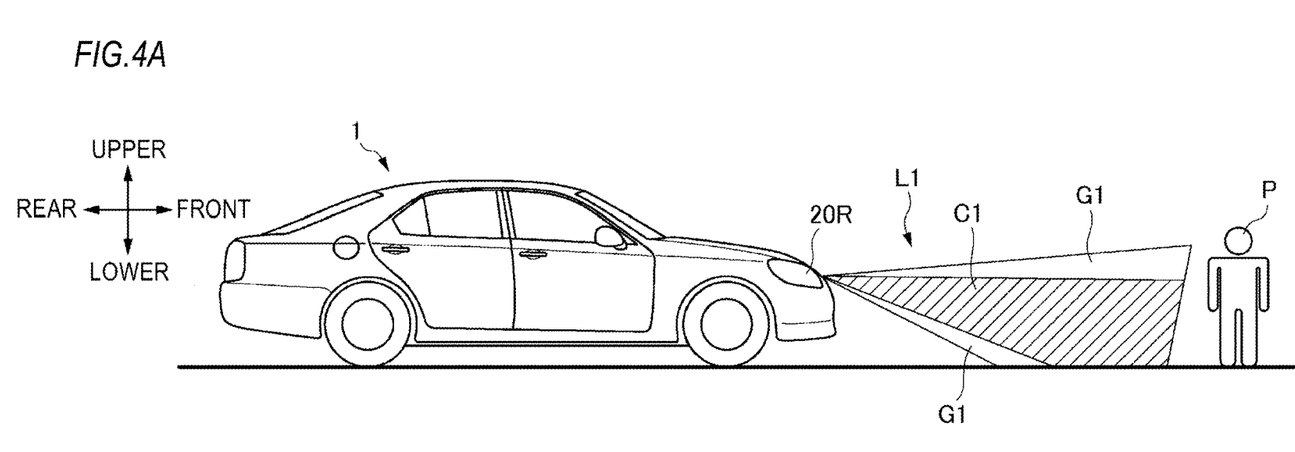
FIG. 4A is a schematic diagram showing light emitted from the right headlamp before an optical axis of the right headlamp is changed.
Figure 4B:
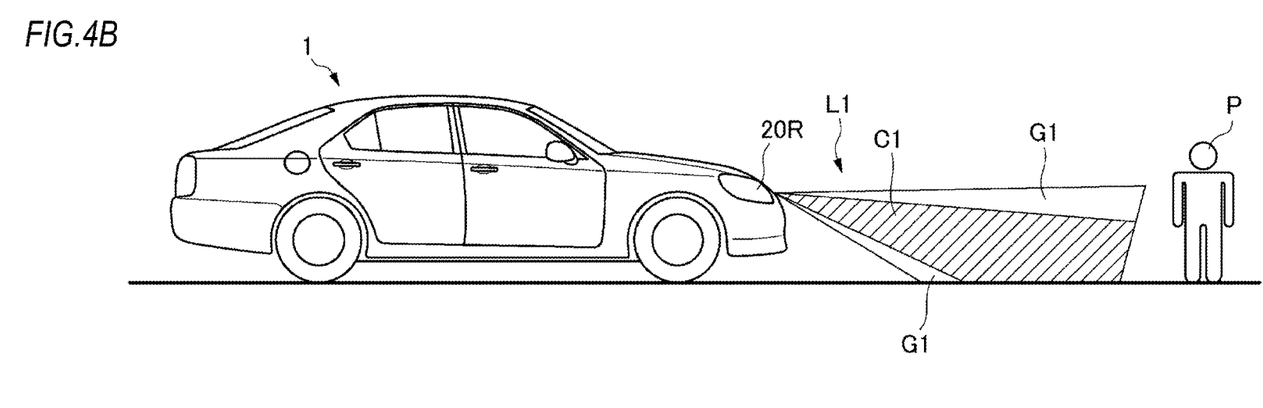
FIG. 4B is a schematic diagram showing light emitted from the right headlamp after the optical axis of the right headlamp is changed.

In the description of the present embodiment, a "left-right direction", an "upper-lower direction", and a "front-rear direction" are appropriately referred to for convenience of explanation. These directions are relative directions set for a vehicle 1 shown in FIG. 1. The "left-right direction" is a direction including a "left direction" and a "right direction". The "upper-lower direction" includes an "upper direction" and a "lower direction". The "front-rear direction" includes a "front direction" and a "rear direction" (for example, see FIG. 4).

Figure 1:
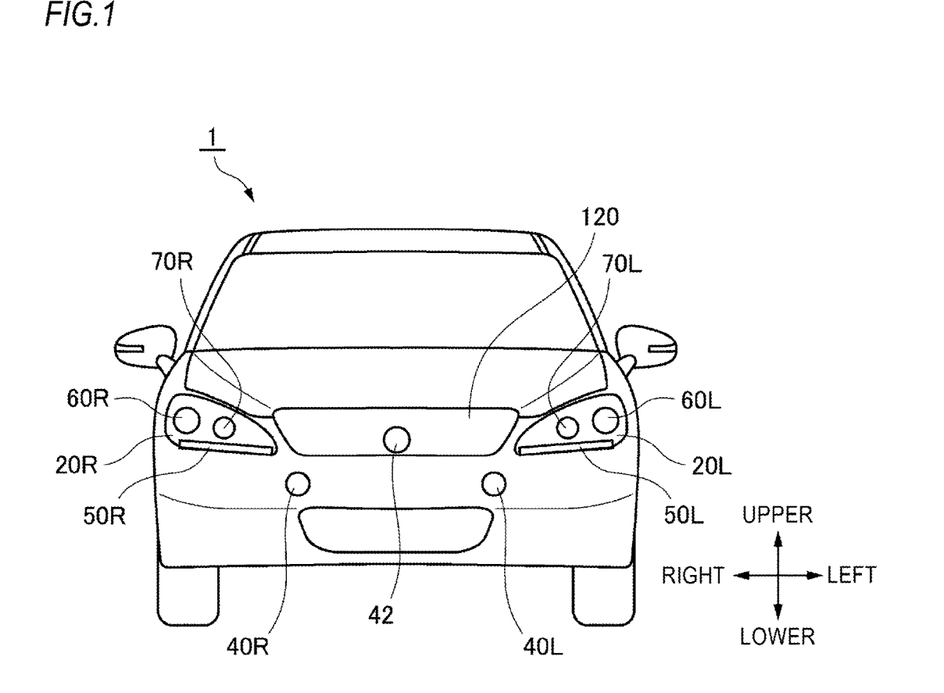
FIG. 1 is a front view of a vehicle mounted with a vehicle lighting system according to an embodiment of the present invention (hereinafter simply referred to as "the present embodiment").
Figure 2:
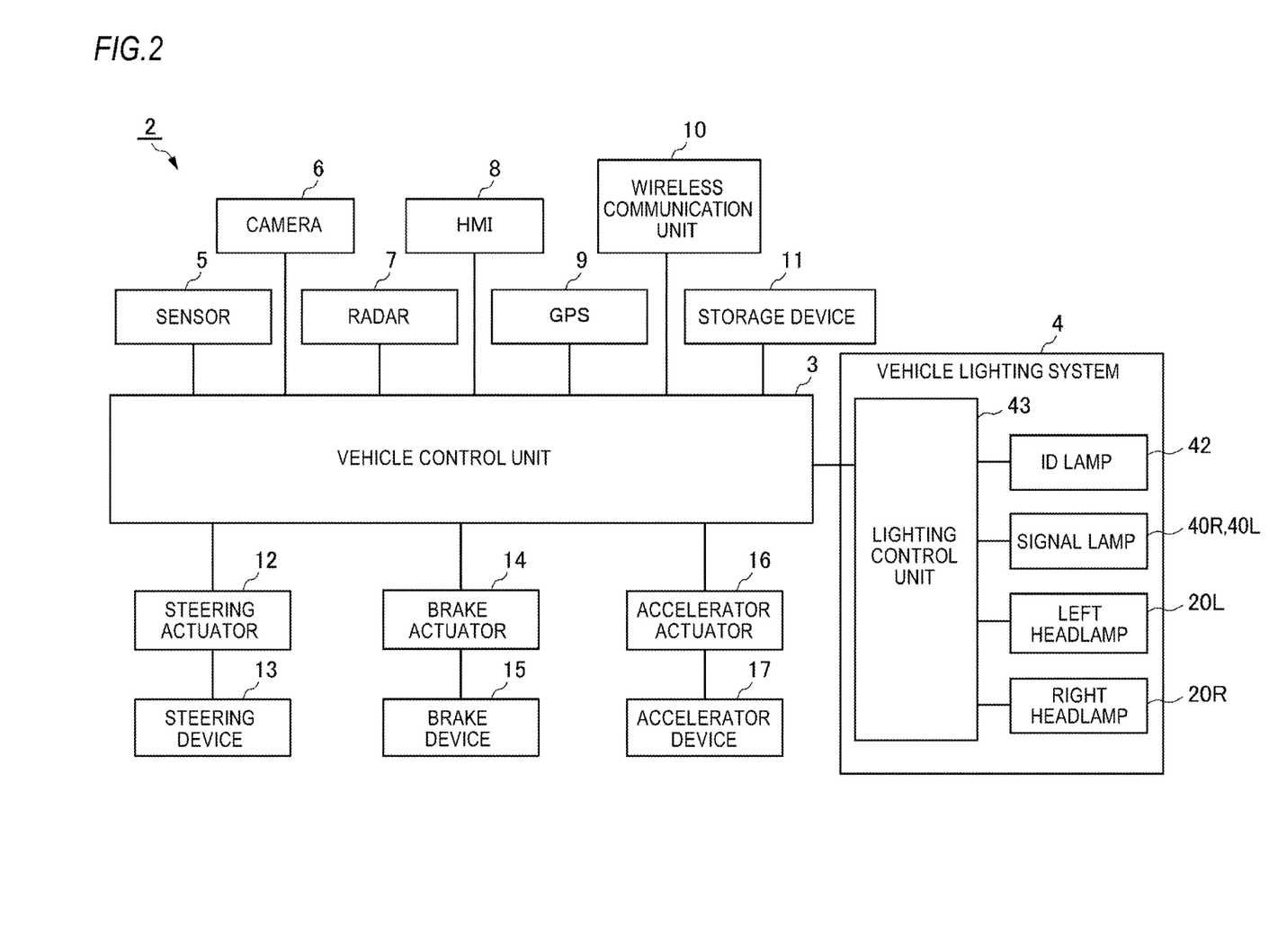
FIG. 2 is a block diagram of a vehicle system including the vehicle lighting system according to the present embodiment.

First, a vehicle lighting system 4 according to the present embodiment (hereinafter, simply referred to as a "lighting system 4") will be described with reference to FIGS. 1 and 2. FIG. 1 is a front view of the vehicle 1 mounted with the lighting system 4. FIG. 2 is a block diagram of a vehicle system 2 including the lighting system 4. The vehicle 1 (an automobile) is capable of traveling in an automated driving mode and includes the vehicle system 2. The lighting system 4 includes a left headlamp 20L, a right headlamp 20R, an ID lamp 42, signal lamps 40R, 40L, and a lighting control unit 43.

The left headlamp 20L is mounted on a front of the vehicle 1, and includes a low-beam lamp 60L configured to irradiate a low beam toward the front of the vehicle 1, a high-beam lamp 70L configured to irradiate a high beam toward the front of the vehicle 1, and a clearance lamp 50L. The low-beam lamp 60L, the high-beam lamp 70L, and the clearance lamp 50L include one or more light emitting elements such as Light Emitting Diodes (LEDs) or Laser Diodes (LDs), and an optical member such as a lens. The low-beam lamp 60L, the high-beam lamp 70L, and the clearance lamp 50L are mounted in a lamp chamber of the left headlamp 20L. The lamp chamber of the left headlamp 20L is formed of a housing (not shown) and a light-transmitting cover (not shown) attached to the housing.

The right headlamp 20R is mounted on the front of the vehicle 1, and includes a low-beam lamp 60R configured to irradiate a low beam toward the front of the vehicle 1, a high-beam lamp 70R configured to irradiate a high beam toward the front of the vehicle 1, and a clearance lamp 50R. The low-beam lamp 60R, the high-beam lamp 70R, and the clearance lamp 50R include one or more light emitting elements such as LEDs or LDs, and an optical member such as a lens. The low-beam lamp 60R, the high-beam lamp 70R, and the clearance lamp 50R are mounted in a lamp chamber of the right headlamp 20R. The lamp chamber of the right headlamp 20R is formed of a housing (not shown) and a light-transmitting cover (not shown) attached to the housing. Hereinafter, for convenience of explanation, the left headlamp 20L and the right headlamp 20R may simply be referred to as headlamps.

The ID lamp 42 is an example of an automated driving system (ADS) lamp configured to emit light toward an outside of the vehicle 1 to visually present information relating to automated driving of the vehicle 1. Specifically, the ID lamp 42 is configured to emit light toward the outside of the vehicle 1 to visually present a driving mode of the vehicle 1. Particularly, the ID lamp 42 is configured to be turned on when the driving mode of the vehicle 1 is an advanced driving support mode or a fully automated driving mode, and turned off when the driving mode of the vehicle 1 is a driving support mode or a manual driving mode. The operation mode of the vehicle 1 will be described below in detail. The ID lamp 42 includes one or more light emitting elements such as LEDs or LDs, and an optical member such as a lens. The ID lamp 42 is disposed in a grille 120 of the vehicle 1. The lighting color of the ID lamp 42 is, for example, yellow (selective yellow). The lighting color, the arrangement place, or the shape of the ID lamp 42 is not particularly limited.

The signal lamps 40L, 40R are examples of the ADS lamp, and are configured to emit light toward the outside of the vehicle 1 to visually present an intention of the vehicle 1. In this regard, the signal lamps 40L, 40R can realize visual communication between the vehicle 1 and an object (for example, another vehicle, a pedestrian or the like) outside the vehicle 1 by changing a lighting mode thereof. For example, the signal lamps 40L, 40R may blink when the vehicle 1 gives way for a pedestrian. In this case, the pedestrian can recognize that the vehicle 1 gives way for the pedestrian by seeing the blinking of the signal lamps 40L, 40R. The signal lamps 40L, 40R include one or more light emitting elements such as LEDs or LDs. and an optical member such as a lens. The signal lamps 40L, 40R are arranged below the grille 120. Particularly, the signal lamps 40L, 40R may be arranged symmetrically with respect to a center line of the vehicle 1. The lighting color of the signal lamps 40L, 40R is, for example, yellow (selective yellow) or white. The lighting color, the arrangement place, or the shape of the signal lamps 40L, 40R is not particularly limited.

Next, the vehicle system 2 of the vehicle 1 will be described with reference to FIG. 2. FIG. 2 shows a block diagram of the vehicle system 2. As shown in FIG. 2, the vehicle system 2 includes a vehicle control unit 3, a lighting system 4, a sensor 5, a camera 6, a radar 7, a Human Machine Interface (HMI) 8, a Global Positioning System (GPS) 9, a wireless communication unit 10, and a storage device 11. Further, the vehicle system 2 includes a steering actuator 12, a steering device 13, a brake actuator 14, a brake device 15, an accelerator actuator 16, and an accelerator device 17.

The vehicle control unit 3 is configured to control the traveling of the vehicle 1. The vehicle control unit 3 includes, for example, at least one electronic control unit (ECU). The electronic control unit includes a computer system (for example, a System on a Chip (SoC) or the like) including one or more processors and one or more memories, and an electronic circuit including an active element such as a transistor and a passive element. The processor is, for example, a Central Processing Unit (CPU), a Micro Processing Unit (MPU), a Graphics Processing Unit (GPU), and/or a Tensor Processing Unit (TPU). The CPU may include a plurality of CPU cores. The GPU may include a plurality of GPU cores. The memory includes a Read Only Memory (ROM) and a Random Access Memory (RAM). The ROM may store a vehicle control program. For example, the vehicle control program may include an artificial intelligence (AI) program for automated driving. The AI program is constructed by supervised or unsupervised machine learning (particularly, deep learning) using a multilayer neural network. The RAM may temporarily store the vehicle control program, vehicle control data, and/or surrounding environment information indicating surrounding environment of the vehicle. The processor may be configured to develop a program selected from various vehicle control programs stored in the ROM on the RAM, and execute various kinds of processing in cooperation with the RAM. Further, the computer system may include a non-von Neumann computer such as an Application Specific Integrated Circuit (ASIC) or a Field-Programmable Gate Array (FPGA). Further, the computer system may include a combination of a von Neumann computer and a non-von Neumann computer.

As described above, the lighting system 4 includes the left headlamp 20L, the right headlamp 20R, the ID lamp 42, the signal lamps 40R, 40L, and the lighting control unit 43. The lighting control unit 43 is configured to control visual modes (lighting modes) of the left headlamp 20L, the right headlamp 20R, the ID lamp 42, and the signal lamps 40R, 40L.

For example, the lighting control unit 43 may change the lighting mode of the emitted light from the left headlamp 20L (or the right headlamp 20R) according to the surrounding environment information indicating the surrounding environment outside the vehicle 1. Particularly, the lighting control unit 43 may switch between the high beam and the low beam according to the surrounding environment information.

The lighting control unit 43 is configured to control turning-on/off of the ID lamp 42 according to the driving mode of the vehicle 1. Further, the lighting control unit 43 is configured to control the visual mode (turning-on/off, blinking or the like) of the signal lamps 40R, 40L in order to realize visual communication between the vehicle 1 and the object (a pedestrian or the like).

The lighting control unit 43 includes an electronic control unit (ECU) and is electrically connected to a power source (not shown). The electronic control unit includes a computer system (for example, a SoC or the like) including one or more processors and one or more memories, and an analog processing circuit including an active element such as a transistor and a passive element. The processor is, for example, a CPU, an MPU, a GPU, and/or a TPU. The memory includes a ROM and a RAM. Further, the computer system may include a non-von Neumann computer such as an ASIC or an FPGA. The analog processing circuit includes a lamp driving circuit (for example, an LED driver or the like) configured to control the driving of the left headlamp 20L, the right headlamp 20R, the ID lamp 42, and the signal lamps 40R, 40L. Further, the analog processing circuit may further include an actuator driving circuit configured to control the driving of an optical axis adjustment actuator configured to adjust optical axes of the headlamps. Here, the optical axis adjustment actuator is configured by a motor and includes a first optical axis adjustment actuator configured to adjust an optical axis of the high-beam lamp and a second optical axis adjustment actuator configured to adjust an optical axis of the low-beam lamp. In the present embodiment, the vehicle control unit 3 and the lighting control unit 43 are provided as separate components, but the vehicle control unit 3 and the lighting control unit 43 may be integrally configured. In this regard, the lighting control unit 43 and the vehicle control unit 3 may be configured by a single electronic control unit. The first optical axis adjustment actuator and the second optical axis adjustment actuator may be integrally configured. That is, one optical axis adjustment actuator may be configured to adjust the optical axis of the high-beam lamp and the optical axis of the low-beam lamp.

The sensor 5 includes an acceleration sensor, a speed sensor, a gyro sensor, or the like. The sensor 5 is configured to detect a traveling state of the vehicle 1 and output traveling state information to the vehicle control unit 3. The sensor 5 may further include a seating sensor which detects whether a driver is sitting on a driver's seat, a face direction sensor which detects a direction of the face of the driver, an external weather sensor which detects an external weather condition, a motion sensor which detects whether a person is in the vehicle, or the like.

For example, the camera 6 includes an imaging element such as a Charge-Coupled Device (CCD) or a complementary MOS (CMOS). The camera 6 is configured to acquire image data indicating the surrounding environment of the vehicle 1 and transmit the image data to the vehicle control unit 3. The vehicle control unit 3 specifies the surrounding environment information based on the transmitted image data. Here, the surrounding environment information may include information about the object (a pedestrian, another vehicle, a sign, or the like) outside the vehicle 1. For example, the surrounding environment information may include information about an attribute of the object outside the vehicle 1 and information about a distance or a position of the object with respect to the vehicle 1. The camera 6 may be configured as a monocular camera or a stereo camera.

The radar 7 is a millimeter wave radar, a microwave radar, and/or a laser radar (for example, a LiDAR unit). For example, the LiDAR unit is configured to detect the surrounding environment of the vehicle 1. Particularly, the LiDAR unit is configured to acquire 3D mapping data (point group data) indicating the surrounding environment of the vehicle 1 and transmit the 3D mapping data to the vehicle control unit 3. The vehicle control unit 3 specifies the surrounding environment information based on the transmitted 3D mapping data.

The HMI 8 includes an input unit which receives an input operation from a driver and an output unit which outputs traveling information or the like to the driver. The input unit includes a steering wheel, an accelerator pedal, a brake pedal, a driving mode switch which switches the driving mode of the vehicle 1, or the like. The output unit is a display which displays various kinds of traveling information. The GPS 9 is configured to acquire current position information of the vehicle 1 and output the acquired current position information to the vehicle control unit 3.

The wireless communication unit 10 is configured to receive information about the other vehicle around the vehicle 1 (for example, traveling information or the like) from the other vehicle and transmit the information about the the vehicle 1 (for example, the traveling information or the like) to the other vehicle (vehicle-to-vehicle communication). The wireless communication unit 10 is configured to receive infrastructure information from infrastructure equipment such as a traffic light and an indicator light, and transmit the traveling information of the vehicle 1 to the infrastructure equipment (road-to-vehicle communication). The wireless communication unit 10 is configured to receive information about a pedestrian from a portable electronic device (a smartphone, a tablet, a wearable device, or the like) carried by the pedestrian and transmit own vehicle travel information of the vehicle 1 to the portable electronic device (pedestrian-to-vehicle communication). The vehicle 1 may directly communicate with the other vehicle, the infrastructure equipment, or the portable electronic device in an ad hoc mode, or may communicate via an access point. Further, the vehicle 1 may communicate with the other vehicle, the infrastructure equipment, or the portable electronic device via a communication network such as the Internet (not shown). The wireless communication standard is, for example, Wi-Fi (registered trademark), Bluetooth (registered trademark), ZigBee (registered trademark), LPWA, DSRC (registered trademark), or Li-Fi. The vehicle 1 may communicate with the other vehicle, the infrastructure equipment, or the portable electronic device by using a fifth generation mobile communication system (5G).

The storage device 11 is an external storage device such as a hard disk drive (HDD) or a Solid State Drive (SSD). The storage device 11 may store 2D or 3D map information and/or a vehicle control program. For example, the 3D map information may be configured by point group data. The storage device 11 is configured to output the map information or the vehicle control program to the vehicle control unit 3 in response to a request from the vehicle control unit 3. The map information and the vehicle control program may be updated via the wireless communication unit 10 and the communication network such as the Internet or the like.

When the vehicle 1 travels in the automated driving mode, the vehicle control unit 3 automatically generates at least one of the steering control signal, the accelerator control signal, and the brake control signal based on the traveling state information, the surrounding environment information, the current position information, the map information or the like. The steering actuator 12 is configured to receive the steering control signal from the vehicle control device 3 and control the steering device 13 based on the received steering control signal. The brake actuator 14 is configured to receive the brake control signal from the vehicle control unit 3 and control the brake device 15 based on the received brake control signal. The accelerator actuator 16 is configured to receive the accelerator control signal from the vehicle control device 3 and control the accelerator device 17 based on the received accelerator control signal. Accordingly, the vehicle control unit 3 automatically controls the traveling of the vehicle 1 based on the traveling state information, the surrounding environment information, the current position information, the map information, or the like. That is, in the automated driving mode, the traveling of the vehicle 1 is automatically controlled by the vehicle system 2.

On the other hand, when the vehicle 1 travels in the manual driving mode, the vehicle control unit 3 generates the steering control signal, the accelerator control signal, and the brake control signal according to a manual operation of the driver to the accelerator pedal, the brake pedal, and the steering wheel. Accordingly, in the manual driving mode, since the steering control signal, the accelerator control signal, and the brake control signal are generated by the manual operation of the driver, the traveling of the vehicle 1 is controlled by the driver.

Next, the driving mode of the vehicle 1 will be described. The driving mode includes the automated driving mode and the manual driving mode. The automated driving mode includes the fully automated driving mode, the advanced driving support mode, and the driving support mode. In the fully automated driving mode, the vehicle system 2 automatically performs all traveling controls including a steering control, a brake control, and an accelerator control, and the driver is not in a state of being capable of driving the vehicle 1. In the advanced driving support mode, the vehicle system 2 automatically performs all the traveling controls including the steering control, the brake control, and the accelerator control, and the driver does not drive the vehicle 1 while the driver is capable of driving the vehicle 1. In the driving support mode, the vehicle system 2 automatically performs some of the traveling controls including the steering control, the brake control, and the accelerator control, and the driver drives the vehicle 1 under the driving support of the vehicle system 2. Meanwhile, in the manual driving mode, the vehicle system 2 does not automatically perform the traveling control, and the driver drives the vehicle 1 without the driving support of the vehicle system 2.

The driving mode of the vehicle 1 may be switched by operating the driving mode switch. In this case, the vehicle control unit 3 switches the driving mode of the vehicle 1 among the four driving modes (the fully automated driving mode, the advanced driving support mode, the driving support mode, and the manual driving mode) according to the operation of the driver to the driving mode switch. Further, the driving mode of the vehicle 1 may be automatically switched based on information about a traveling permitted section where the traveling of the automated driving vehicle is permitted and a traveling prohibited section where the traveling of the automated driving vehicle is prohibited or information about the external weather condition. In this case, the vehicle control unit 3 switches the driving mode of the vehicle 1 based on these kinds of external information. Further, the driving mode of the vehicle 1 may be automatically switched by using the seating sensor, the face direction sensor, or the like. In this case, the vehicle control unit 3 switches the driving mode of the vehicle 1 based on an output signal from the seating sensor or the face direction sensor.

Figure 3:
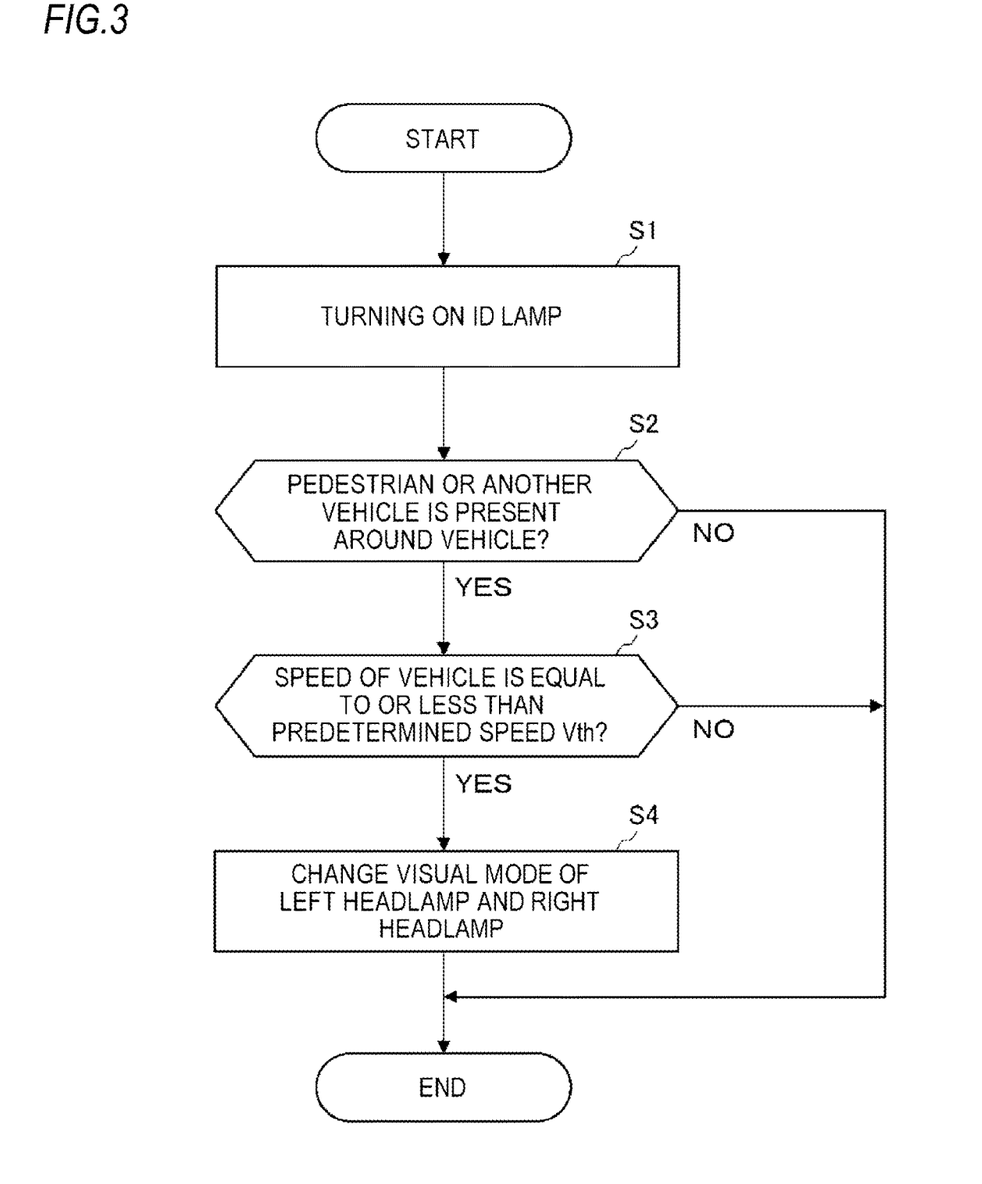
FIG. 3 is a flowchart illustrating an example of processing of changing a visual mode of a left headlamp and a right headlamp according to the turning-on of an ID lamp.
Figure 5A:
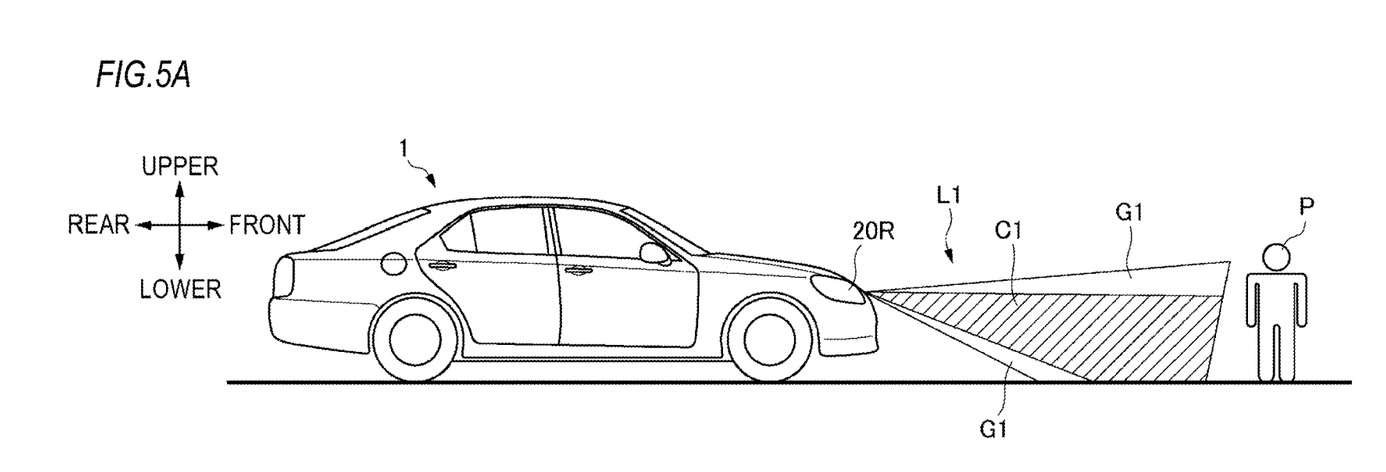
FIG. 5A is a schematic diagram showing light emitted from the right headlamp before the brightness of the right headlamp is changed.
Figure 5B:
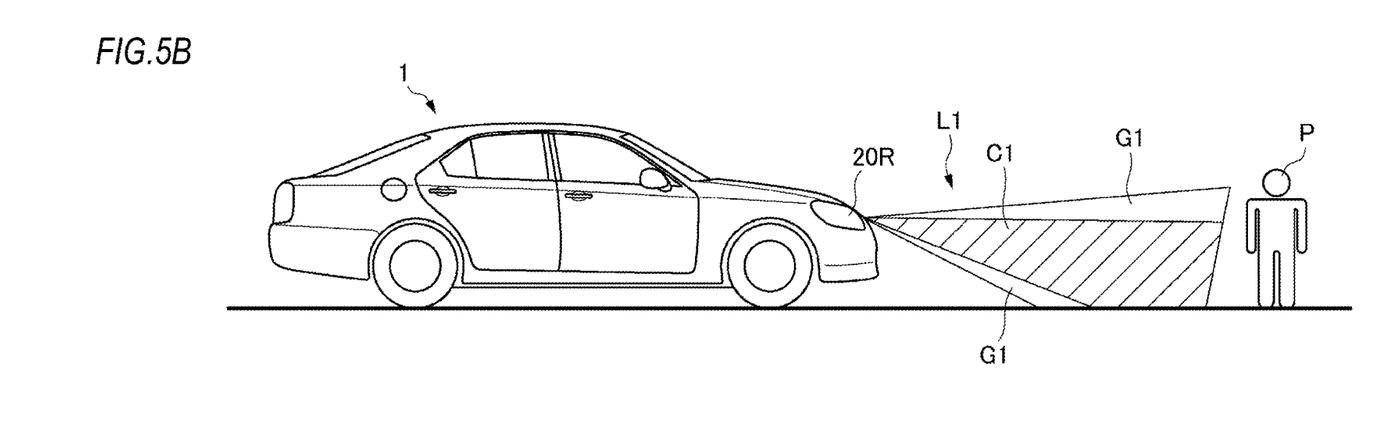
FIG. 5B is a schematic diagram showing light emitted from the right headlamp after the brightness of the right headlamp is changed.

Next, with reference to FIGS. 3 to 5, processing for changing the visual mode of the left headlamp 20L and the right headlamp 20R according to the turning-on of the ID lamp 42 will be described. FIG. 3 is a flowchart illustrating an example of processing of changing the visual mode of the left headlamp 20L and the right headlamp 20R according to the turning-on of the ID lamp 42. FIG. 4A is a schematic diagram showing emitted light L1 from the right headlamp 20R before the optical axis of the right headlamp 20R is changed. FIG. 4B is a schematic diagram showing the emitted light L1 after the optical axis of the right headlamp 20R is changed. FIG. 5A is a schematic diagram showing the emitted light L1 from the right headlamp 20R before the brightness of the right headlamp 20R is changed. FIG. 5B is a schematic diagram showing the emitted light L1 after the brightness of the right headlamp 20R is changed.

As shown in FIG. 3, first, the lighting control unit 43 turns on the ID lamp 42 (step S1). Specifically, the lighting control unit 43 turns on the ID lamp 42 when receiving a signal indicating that the driving mode of the vehicle 1 is the advanced driving support mode or the fully automated driving mode from the vehicle control unit 3. On the other hand, the lighting control unit 43 turns off the ID lamp 42 when receiving a signal indicating that the driving mode of the vehicle 1 is the driving support mode or the manual driving mode from the vehicle control unit 3. Here, the driving mode of the vehicle 1 may be automatically switched by the vehicle control unit 3 or may be manually switched by an occupant. When the driving mode of the vehicle 1 is changed, the vehicle control unit 3 transmits the signal indicating the driving mode of the vehicle 1 to the lighting control unit 43.

Next, in step S2, the vehicle control unit 3 determines whether the pedestrian and/or the other vehicle (an example of the object) is present around the vehicle 1. Specifically, the vehicle control unit 3 determines whether the pedestrian and/or the other vehicle is present around the vehicle 1 based on the image data acquired from the camera 6 and/or the detection data (for example, the point group data) acquired from the radar 7 (for example, the LiDAR unit). When the determination result of step S2 is YES, the processing proceeds to step S3. When the determination result of step S2 is NO, the processing ends.

Next, in step S3, the vehicle control unit 3 determines whether a current speed V of the vehicle 1 is equal to or less than a predetermined speed Vth. Specifically, the vehicle control unit 3 receives data indicating the current speed V of the vehicle 1 from the speed sensor, and determines whether the current speed V of the vehicle 1 is equal to or less than the predetermined speed Vth based on the received data. For example, the predetermined speed Vth is 30 km/h. The predetermined speed Vth may be appropriately changed according to a traveling area of the vehicle 1. When the determination result of step S3 is YES, the vehicle control unit 3 transmits to the lighting control unit 43 an instruction signal for instructing the left headlamp 20L and the right headlamp 20R to change the visual mode. On the other hand, when the determination result of step S3 is NO, the processing ends.

Next, in step S4, the lighting control unit 43 changes the visual mode of the left headlamp 20L and the right headlamp 20R such that the visibility of the ID lamp 42 from the outside of the vehicle 1 (particularly, a pedestrian P outside the vehicle 1) is improved in accordance with the instruction signal transmitted from the vehicle control unit 3. As an example of changing the visual mode of the left headlamp 20L and the right headlamp 20R, the lighting control unit 43 may tilt the optical axes of the right headlamp 20R and the left headlamp 20L downward. For example, when the right headlamp 20R emits a low beam to the outside, the lighting control unit 43 can tilt the optical axis of the low-beam lamp 60R downward by controlling the driving of the second optical axis adjustment actuator configured to adjust the optical axis of the low-beam lamp 60R.

As shown in FIG. 4A, the emitted light L1 from the right headlamp 20R (specifically, the low-beam lamp 60R) includes main emitted light C1 mainly forming a low-beam light distribution pattern and peripheral light G1 around the main emitted light C1. In this case, the peripheral light G1 of the emitted light L1 may cause glare to the pedestrian P outside the vehicle 1. Therefore, since the peripheral light G1 becomes the glare light, the pedestrian P may not sufficiently visually recognize the light of the ID lamp 42 due to the peripheral light G1 emitted from the right headlamp 20R. On the other hand, when the optical axis of the low-beam lamp 60R is tilted downward by the lighting control unit 43, as shown in FIG. 4B, the entire emitted light L1 including the peripheral light G1 is tilted downward, so that a situation where the peripheral light G1 causes glare to the pedestrian P can be avoided. As a result, the visibility of the ID lamp 42 from the pedestrian P can be improved. Further, the pedestrian P can clearly grasp the driving mode of the vehicle 1 by visually recognizing a turning-on state or a turning-off state of the ID lamp 42. Although only the adjustment of the optical axis of the right headlamp 20R is described in this description, it should be noted that not only the optical axis of the right headlamp 20R but also the optical axis of the left headlamp 20L is tilted downward.

As another example of changing the visual mode of the left headlamp 20L and the right headlamp 20R, the lighting control unit 43 may reduce the brightness of the right headlamp 20R and the left headlamp 20L. Here, the "brightness of the headlamp" refers to the luminance or luminous intensity of the headlamp, or the illuminance of an area illuminated by the emitted light from the headlamp. For example, when the right headlamp 20R emits a low beam to the outside, the lighting control unit 43 can reduce the brightness of the low-beam lamp 60R by adjusting a current supplied to the low-beam lamp 60R. In this regard, the lighting control unit 43 can reduce the brightness of the low-beam lamp 60R by modulating the pulse width of an electric signal or decreasing a current value supplied to the light emitting element of the low-beam lamp 60R.

As shown in FIG. 5A, among the emitted light L1 from the right headlamp 20R (specifically, the low-beam lamp 60R), the peripheral light G1 may cause glare to the pedestrian P. Meanwhile, as shown in FIG. 5B, even when eyes of the pedestrian P is directly irradiated with the peripheral light G1, a situation where the peripheral light G1 causes glare to the pedestrian P can be avoided by reducing the brightness of the low-beam lamp 60R. As a result, the visibility of the ID lamp 42 from the pedestrian P can be improved. Further, the pedestrian P can clearly grasp the driving mode of the vehicle 1 by visually recognizing the turning-on state or the turning-off state of the ID lamp 42. Although only the adjustment of the brightness of the right headlamp 20R is described in this description, it should be noted that not only the brightness of the right headlamp 20R but also the brightness of the left headlamp 20L is reduced.

Further, as another example of changing the visual mode of the left headlamp 20L and the right headlamp 20R, the lighting control unit 43 may change the light distribution pattern formed by the right headlamp 20R and the left headlamp 20L. For example, it is assumed that the low-beam light distribution pattern is formed by the right headlamp 20R and the left headlamp 20L. In this case, the lighting control unit 43 may change the low-beam light distribution pattern to a light distribution pattern formed by the clearance lamp. Specifically, as shown in FIG. 1, the lighting control unit 43 may turn off the low-beam lamp 60R while maintaining the turning-on of the clearance lamp 50R. Further, the lighting control unit 43 may turn off the low-beam lamp 60L while maintaining the lighting-on of the clearance lamp 50L. Accordingly, since the low-beam light distribution pattern is changed to the light distribution pattern formed by the clearance lamp, the visibility of the ID lamp 42 from the pedestrian or the like around the vehicle 1 can be improved.

Further, according to the present embodiment, not only the visibility of the ID lamp 42 but also the visibility of the signal lamps 40R, 40L can be improved. When the ID lamp 42 is turned on and the visual mode (lighting-on, blinking, or the like) of the signal lamps 40R. 40L is changed, the lighting control unit 43 may further change the visual mode of the left headlamp 20L and the right headlamp 20R such that the visibility of the ID lamp 42 and the signal lamps 40R, 40L from the outside of the vehicle 1 (the pedestrian or the like) is improved. For example, the lighting control unit 43 may further reduce the brightness of the left headlamp 20L and the right headlamp 20R. Accordingly, the pedestrian P can clearly grasp the driving mode and the intention of the vehicle 1 by seeing changes in the turning-on of the ID lamp 42 and the visual mode of the signal lamps 40R, 40L.

In the present embodiment, when both the determination results of steps S2 and S3 are YES, the visual mode of the left headlamp 20L and the right headlamp 20R is changed, but the present embodiment is not limited thereto. For example, the processing of step S4 may be performed after the processing of step S is executed without the determination processing of steps S2 and S3. That is, the lighting control unit 43 may change the visual mode of the headlamps according to the turning-on of the ID lamp 42. Further, when the determination processing of step S2 is YES after the processing of step S1 is executed, the processing of step S4 may be executed. That is, the lighting control unit 43 may change the visual mode of the headlamps according to the turning-on of the ID lamp 42 and the detection of a pedestrian or the like around the vehicle 1. Further, when the determination processing of step S3 is YES after the processing of step S is executed, the processing of step S4 may be executed. That is, the lighting control unit 43 may change the visual mode of the headlamps according to the turning-on of the ID lamp 42 and the current speed V of the vehicle 1.

Although the embodiment of the present invention has been described, it is needless to say that the technical scope of the present invention should not be interpreted as being limited by the description of the present embodiment. It is to be appreciated by those skilled in the art that the present embodiment is merely an example and that various modifications can be made within the scope of the invention described in the claims. The technical scope of the present invention should be determined based on the scope of the invention described in the claims and the equivalent scope thereof.

In the present embodiment, the driving mode of the vehicle has been described as including the fully automated driving mode, the advanced driving support mode, the driving support mode, and the manual driving mode, but the driving mode of the vehicle should not be limited to these four modes. The classification of the driving mode of the vehicle may be appropriately changed according to laws or regulations relating to automated driving in each country. Similarly, the definitions of the "fully automated driving mode", the "advanced driving support mode", and the "driving support mode" described in the description of the present embodiment are merely examples, and the definitions may be appropriately changed according to laws or regulations relating to automated driving in each country.

The invention claimed is:

1. A vehicle lighting system provided in a vehicle capable of traveling in an automated driving mode, the vehicle lighting system comprising:
   a headlamp mounted on a front of the vehicle;
   an automated driving system (ADS) lamp configured to emit light toward an outside of the vehicle to visually present information relating to automated driving of the vehicle; and
   a lighting control unit configured to control visual modes of the headlamp and the ADS lamp,
   wherein the lighting control unit is configured to change the visual mode of the headlamp such that visibility of the ADS lamp from the outside of the vehicle is improved according to at least turning-on of the ADS lamp.

2. The vehicle lighting system according to claim 1, wherein the lighting control unit is configured to change the visual mode of the headlamp such that the visibility of the ADS lamp from the outside of the vehicle is improved according to the turning-on of the ADS lamp and detection of an object around the vehicle.

3. The vehicle lighting system according to claim 1, wherein the lighting control unit is configured to change the visual mode of the headlamp such that the visibility of the ADS lamp from the outside of the vehicle is improved according to the turning-on of the ADS lamp and speed of the vehicle.

4. The vehicle lighting system according to claim 1, wherein the lighting control unit is configured to change the visual mode of the headlamp such that the visibility of the ADS lamp from the outside of the vehicle is improved according to the turning-on of the ADS lamp, detection of an object around the vehicle, and speed of the vehicle.

5. The vehicle lighting system according to claim 1, wherein the lighting control unit is configured to tilt an optical axis of the headlamp downward according to at least the turning-on of the ADS lamp.

6. The vehicle lighting system according to claim 1, wherein the lighting control unit is configured to reduce brightness of the headlamp according to at least the turning-on of the ADS lamp.

7. The vehicle lighting system according to claim 1, wherein the lighting control unit is configured to change a light distribution pattern formed by the headlamp according to at least the turning-on of the ADS lamp.

8. A vehicle capable of traveling in an automated driving mode, the vehicle comprising:
   a front; and
   a vehicle lighting system including:
   a headlamp mounted on the front of the vehicle;
   an automated driving system (ADS) lamp configured to emit light toward an outside of the vehicle to visually present information relating to automated driving of the vehicle; and
   a lighting control unit configured to control visual modes of the headlamp and the ADS lamp,
   wherein the lighting control unit is configured to change the visual mode of the headlamp such that visibility of the ADS lamp from the outside of the vehicle is improved according to at least turning-on of the ADS lamp.

* * * * *